United States Patent [19]

Heckenkamp

[11] 4,173,259

[45] Nov. 6, 1979

[54] REAR DRIVE ASSEMBLY WITH LOAD SENSING

[75] Inventor: Edward B. Heckenkamp, Brookfield, Wis.

[73] Assignee: Allis-Chalmers Corporation, Milwaukee, Wis.

[21] Appl. No.: 865,675

[22] Filed: Dec. 29, 1977

[51] Int. Cl.$^2$ ............... A01B 63/112; A01B 63/12
[52] U.S. Cl. .................................. 172/10; 172/7; 180/290
[58] Field of Search ............... 172/2, 3, 7, 9, 10, 172/11, 12; 37/DIG. 1; 214/762, 763; 280/405 B, 406 R, 446 A; 180/100, 103 R

[56] References Cited

U.S. PATENT DOCUMENTS

| 3,324,287 | 6/1967 | Fetterman et al. | 180/100 X |
| 3,814,188 | 6/1974 | Ahne | 172/7 |
| 3,825,072 | 7/1974 | Collins | 172/7 |

FOREIGN PATENT DOCUMENTS 1260220 2/1968 Fed. Rep. of Germany ............ 172/7

Primary Examiner—Richard T. Stouffer
Attorney, Agent, or Firm—Arthur L. Nelson

[57] ABSTRACT

A load-sensing device for sensing strain on the rear drive housing responsive to draft loads on the vehicle for generating a signal for controlling the raising and lowering of an implement through a hydraulic system of distributing vehicle weight or vehicle and implement weight.

9 Claims, 5 Drawing Figures

REAR DRIVE ASSEMBLY WITH LOAD SENSING

This invention relates to a load sensing device and more particularly to a load sensing device sensing deformation on the rear drive housing of a draft vehicle to control the draft load by raising and lowering of an implement.

The conventional tractor using a draft load sensing device for controlling the draft load by raising and lowering the implement response to draft loads employs a mechanical load sensing device. The device may include a torsion bar which is under a strain which produces a deformation proportional to the draft load applied to the tractor. The load sensed requires an elaborate coupling arrangement for transmitting the load through the load sensing torsion bar and a suitable mechanical linkage for amplifying the signal responsive to the strain in the bar for controlling a hydraulic valve in a hydraulic weight distribution system. While this system is generally practical for tractors presently in use, the modern tractor is increasing in size and the coupling devices are increasingly expensive. Due to the increase in size of the torsion bar and the sensing mechanism, considerable space is required on the tractor which is needed to provide other functions for implement and tractor control. The torsional bar and sensing mechanism must overcome friction of associated mechanisms in operation but there are certain hysteresis losses in the system which decrease the accuracy of the sensing system.

Accordingly, this invention provides a means whereby the torsion bar may be eliminated from the coupling and the sensing accomplished by deformation of the rear drive housing per se which allows a coupling to be attached directly to the tractor housing and thereby eliminate the need for a torsion bar. This simplifies the coupling, reduces the space requirements for the sensing mechanism and allows the sensing to be accomplished by a component which is normally on the tractor.

It is an object of this invention to provide a strain sensing device for sensing draft loads on a tractor for controlling a hydraulic weight distribution system.

It is another object of this invention to provide a draft load sensing device for sensing deformation of the rear drive assembly housing responsive to draft loads on the tractor.

It is a further object of this invention to provide a draft load sensing device sensing strain on the rear drive housing responsive to the draft loads on the vehicle for controlling the draft load on the vehicle.

It is a further object of this invention to provide a draft load sensing device sensing deformation on the drive housing and an amplifier for amplifying the signal to operate a control valve in a hydraulic weight distribution system to vary the draft load in accordance with the sensed deformation of the drive housing.

The objects of this invention are accomplished by providing a sensing device sensing strain on the rear drive assembly housing. The load is applied to the housing through a coupling for an implement. As the drive wheels drive the vehicle forwardly, a strain is produced on the final drive assembly housing and the deformation due to the strain is sensed. The sensing may be electrical or mechanical and the signal produced by this strain is amplified and then controls a hydraulic control valve in an hydraulic weight distribution system. This signal operates the control valve to redistribute the weight on the vehicle by raising or lowering of the implement or through hydraulic actuators which raise and lower the implement to vary the draft load on the vehicle. The strain on the final drive assembly housing is produced by the rearward force on the vehicle in opposition to the forward forces of the drive wheels which drive the draft vehicle forwardly. In the case of the rear wheel drive tractor, the drive shaft housing operates similarly to a cantilever beam in which the forward force of the wheels causes a bending movement on the rear axle housings as the rearward force on the central portion of the tractor produces a counteracting force. This force produces a deformation which is sensed and then amplified and controls the operation of the hydraulic weight distribution system.

Referring to the drawings, the preferred embodiment of this invention is illustrated.

FIG. 3 illustrates a mechanical means of sensing draft load on the tractor and controlling the hydraulic valve of a hydraulic weight distribution system;

FIG. 4 is a cross-section view of the control valve shown in FIG. 3; and

Figure 2:
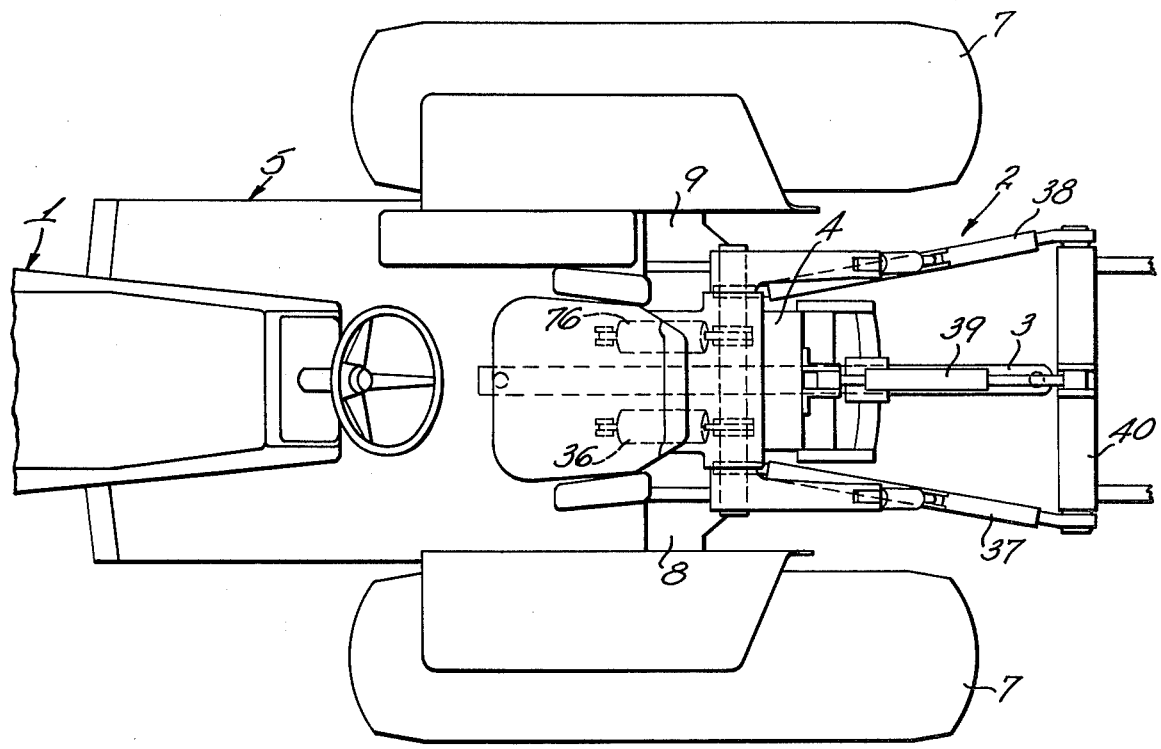
FIG. 2 is a plan view of a tractor with a drawbar and three-point hitch connected to the chassis for coupling of an implement.
Figure 1:
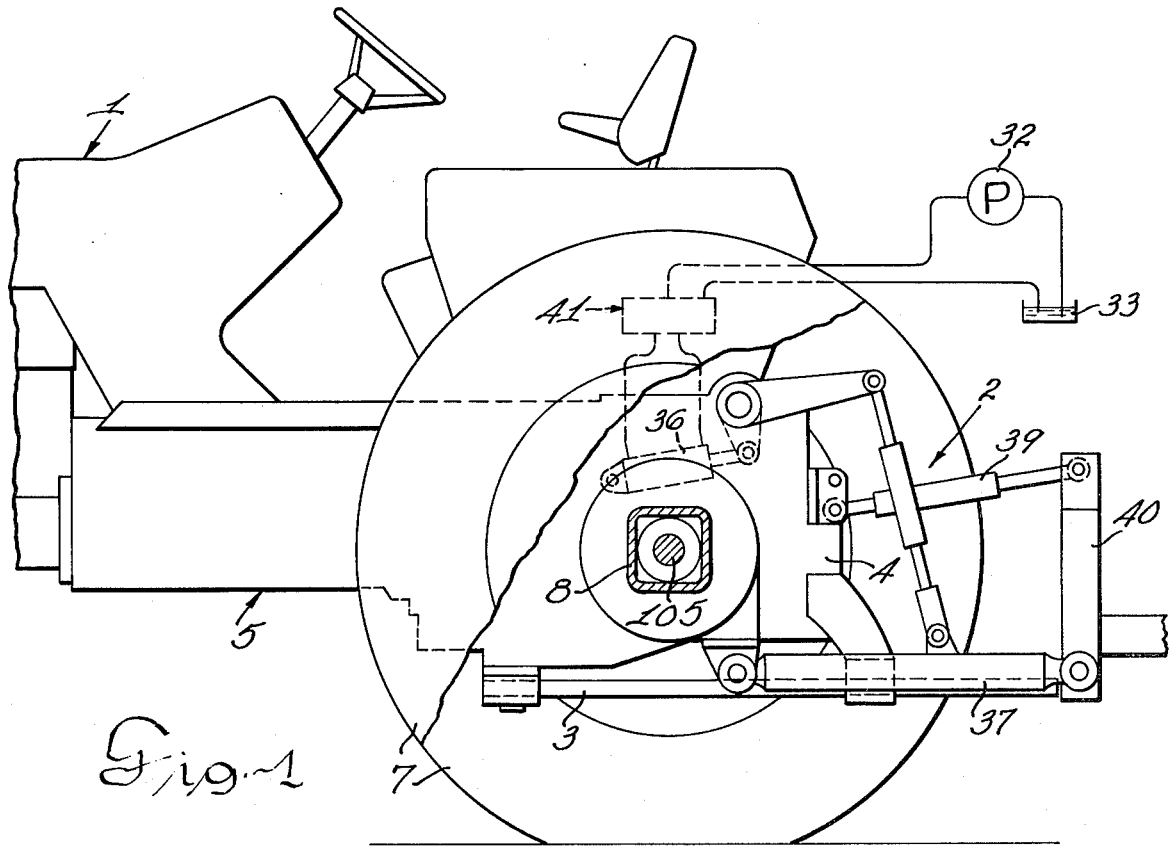
FIG. 1 is a side elevation view of the tractor shown in FIG. 2.
Figures 3, 4:
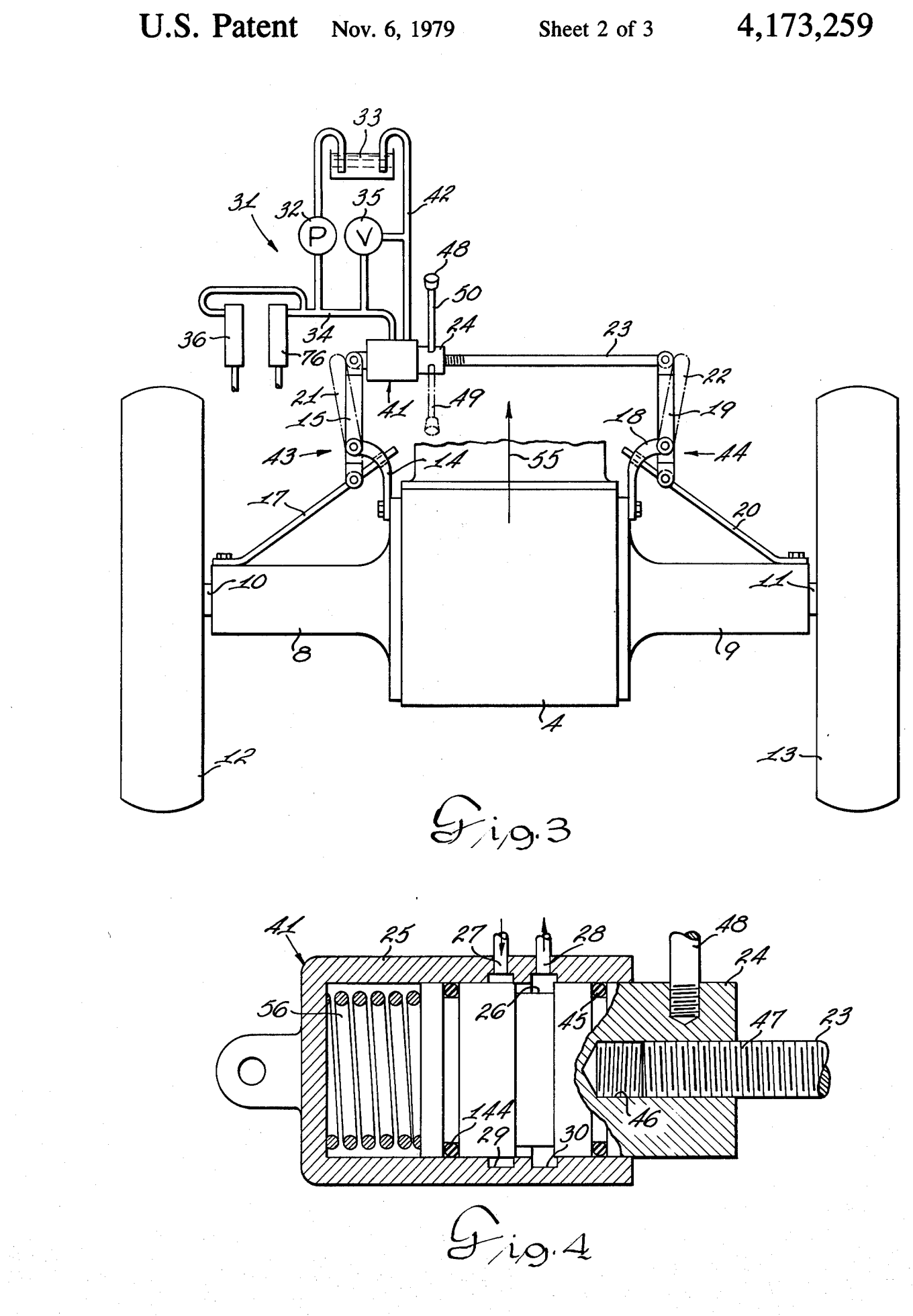

FIGS. 1 and 2 show views of the tractor 1 with a three-point hitch 2 mounted thereon. A drawbar 3 is mounted on the rear drive assembly housing 4 which defines a portion of the vehicle chassis 5. A coupling such as a three-point hitch 2 or the drawbar 3 is centrally mounted on the vehicle chassis 5 and provides a means for connecting the implement to the tractor 1. The rear drive assembly drives the rear drive shafts of which drive shaft 105 is shown rotatably mounted in the rear axle housing 8. The rear drive wheels 7 drive the tractor. The rear drive wheels 7 produce a forward driving force on the rear drive assemblies which tends to deform the housings and deformation produces a signal which is sensed to initiate an electrical signal in the strain gauges or a mechanical signal initiated as shown in FIG. 3.

The rear drive axle housings 8 and 9 house the drive shafts 10 and 11, respectively. The drive shafts 10 and 11 drive the drive wheels 12 and 13, respectively, as shown in FIG. 3. The vehicle drives in the direction of the arrow 55 on the centerline of the tractor. The bracket 14 supports the lever 15 which is operated by the link 17 which is also connected to the final drive housing 4 and rear drive axle housing 8. Similarly, the bracket 18 supports the lever 19 which is operated by the link 20. The levers 15 and 19 pivot to the phantom positions 21 and 22 as the drive axle housings 8 and 9 bend forwardly due to the force of the driving rear wheels 12 and 13. The deflection of the links 17 and 20 is caused by the deformation of the drive axle housings which are cantilever mounted on the final drive housing 4. With the deflection as indicated, the rod 23 will tend to withdraw the piston 24 from the cylinder 25. Piston 24 forms a valve with the cylinder 25 by aligning and misaligning the recess 26 with the ports 27 and 28 to vent pressurized fluid to sump 33. The recesses 27 and 28 are in communication with the annular grooves 29 and 30.

The hydraulic system 31 includes a pump 32 receiving fluid from the sump 33 and pressurizing fluid in the conduit 34. A relief valve 35 limits a predetermined maximum pressure in the conduit 34. A pair of rams 36 and 76 provide the lifting for the lower draft arms 37 and 38. The upper link 39 is connected to an implement 40 which can be raised or lowered through the hydraulic rams 36 and 76. The control valve 41 controls the flow of pressurized fluid through the return conduit 42 to sump 33. The control valve 41 includes a spring 56 to prevent any lost motion in the linkages 43 and 44 which operate the control valve 41. Since the deflection produced by deformation of the rear drive axle 8 and 9 is relatively small, lost motion must be eliminated from the mechanism.

The piston 24 is provided with seals 144 and 45 in annular grooves of the piston 24 to prevent leakage from the annular grooves 29 and 30. The threaded opening 46 receives the threaded end 47 of the rod 23. Piston 24 is connected to a control lever 48 which can be rotated to shut off the control valve completely for raising the implement as shown in the lever position 49 or by positioning the lever 48 in the position 50 as shown. The threaded portion of the rod 47 is a right-hand thread which will raise the implement when in the position 49 as shown.

Figure 5:
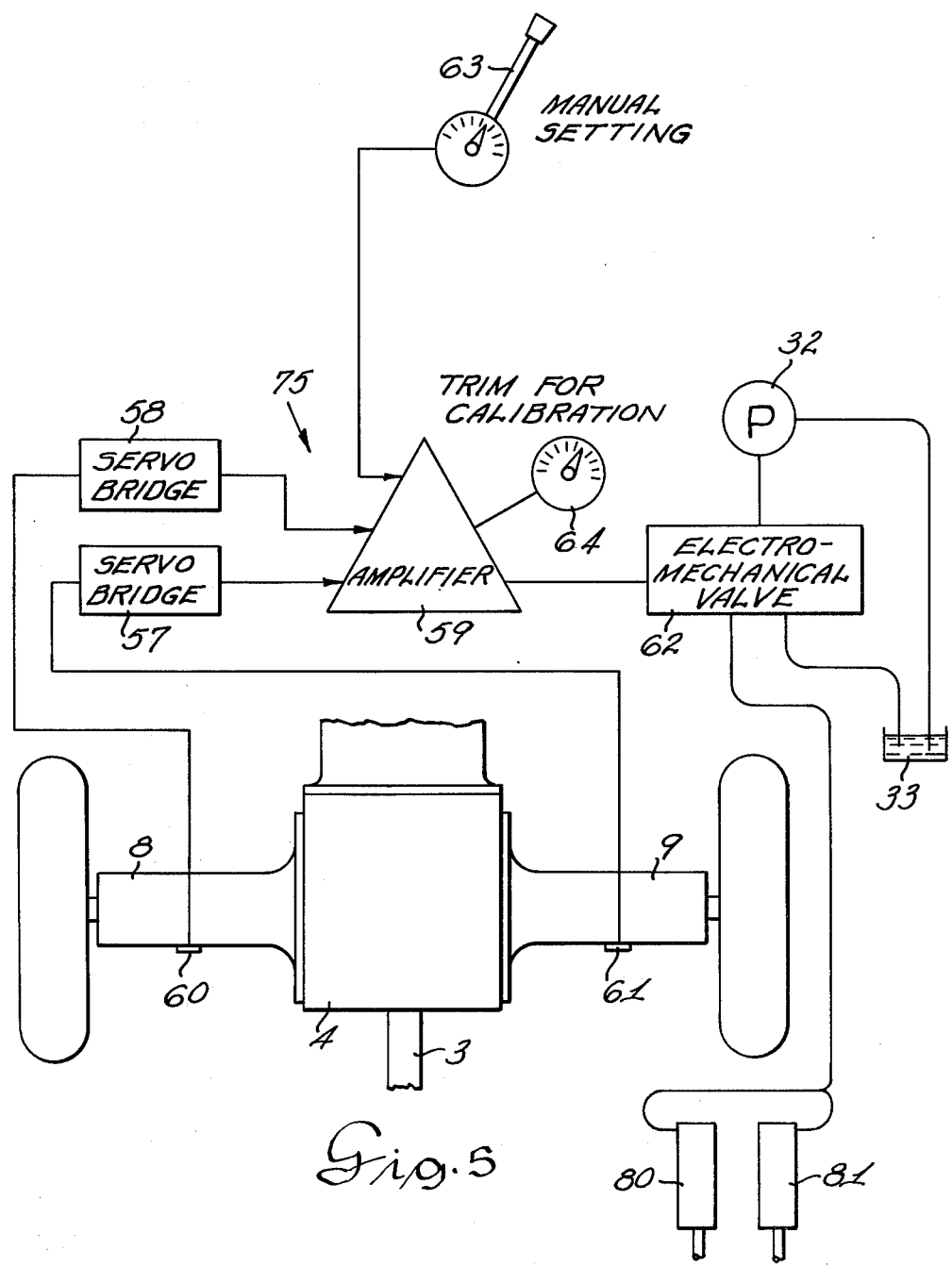
FIG. 5 is a modification of the sensing device in which the strain gauges are mounted on the final drive assembly housing for sensing draft load.

FIG. 5 is a modification in which an electrical system using strain gauges 60 and 61 are mounted on the rear drive axle housings 8 and 9. The strain gauges 60 and 61 are connected through the servo bridge circuits 57 and 58 and the output signal is applied to the amplifier 59. The advantage of placing the strain gauges 60 and 61 on the rear drive axle housing is that it reduces the mechanical hardware required for operating the system. The strain gauges may be mounted on any member deforming responsive to draft loads such as the final drive assembly housing. A suitable means of fastening and replacing of the strain gauges for servicing would be provided in conjunction with the electrical calibration system to provide the sensitivity desired by the system.

The electrical system includes the strain gauges 60 and 61 which generate signals applied to the amplifier 59 and the output of the amplifier is an electrical signal which controls the electro-mechanical valve 62 in the hydraulic weight distribution system.

The lever 63 controls the operation of the electrical system which can either turn the system off completely or place the system in operation which would control the hydraulic weight distribution system when a sufficient stress is placed on the deforming member. The trimmer 64 is for calibration which can set for any preload signal desired before the system operates which is similar to the mechanical systems which have a preload torque on the torsion bar which must be overcome before a mechanical signal is generated for operating the hydraulic weight distribution system. The trimmer 64 may be of various types such as a bias control on a transistor which would prevent the electrical circuit from operating before a bias of a predetermined value is applied to the transistor in the circuit. The primary purpose of the calibration is to preset the system for accuracy and also provide a repeatable minimum draft load which will establish a minimum operating draft load reference.

The operation of the devices will be described in the following paragraphs.

FIG. 1 shows a draft vehicle in which a three-point hitch 2 and a drawbar 3 are centrally mounted on the vehicle. These hitches are mounted in much the same manner as a conventional tractor; however, the torsion bar for supporting the three-point hitch is eliminated. Three-point hitch is mounted directly to the final drive assembly housing. The draft load is centrally applied to the vehicle which produces a force rearwardly along the centerline of the vehicle. The drive wheels drive forwardly producing parallel forces on opposing sides of the tractor. Since the rear drive axle housings are cantilever mounted on the rear drive assembly housing, there is a deformation of the final drive housing 4 and rear axle housings 8 and 9. The deformation of the housings caused by the strain between the driving forces on the wheel and the draft force on the tractor are sensed. A sensing mechanism is provided to sense the deformation and initiate a draft load control signal. The draft load control signal may be either a mechanical movement which is amplified to operate a control valve 41 as shown in FIG. 3 or it may be an electrical signal from the strain gauges 60 and 61 which operate an electrical system 75 which amplifies the strain gauge signals and provides an electrical signal for operating electro-mechanical hydraulic valves 62. In either case, the output signal will operate the valve 62 to operate the hydraulic lift cylinders 80 and 81 which will raise or lower draft arms 37 and 38 to raise or lower the three-point hitch or may be adapted for use with a draw bar 3 and hydraulic cylinders 80 and 81 on the implement 40. A similar arrangement can be used for operation with the drawbar 3 to raise and lower the implement or a remote hydraulic lift cylinder can be employed on the implement which is connected through hydraulic couplings between the tractor and the implement to raise and lower the implement in response to the draft load. Any suitable system for raising and lowering of the implement or the hitch may be used by the draft load sensing system.

The mechanism system as shown in FIG. 3 employs the basic principle of the mechanical sensing system for sensing strain in the final drive housing as shown. The hydraulic system is schematically illustrated and operates in response to the draft load. The deformation of the final drive housing initiates a mechanical movement signal which is amplified and, in turn, controls a hydraulic lift system for the implement.

The electrical system requires a transducer to sense the mechanical movement due to the deformation caused by the draft load and will initiate an electrical signal which then, in turn, is amplified. The amplified signal is of such a magnitude that it can be used to operate a relay and then energize a battery circuit or directly operate the electro-mechanical hydraulic valve 62. The calibration circuit provides accuracy between the right and left drive housings and also to control the minimum load for initiation of the signal responsive to draft load. Similarly, the mechanical or the electrical system has a lever which completely cuts off operation of the sensing device or initiates the operation of the sensing device when desired by the operator.

The embodiments of the invention in which an exclusive property or privilege is claimed are defined as follows:

1. A load sensing system on a vehicle comprising, a vehicle, a vehicle chassis, a draft load hitching means connected to said vehicle chassis adapted for connection to an implement, drive wheel axles with drive wheels attached thereto, said axles rotatably mounted in axle drive housings on either side of said vehicle chassis for driving said vehicle, a draft load sensing means mounted on each of said drive axle housings of said vehicle chassis and spaced from said hitching means, said sensing means directly sensing strain and deformation across a portion of said axle housings of said chassis responsive to the opposing forces of the draft load on said hitching means and the driving force from the drive wheels for operating a draft load control system.

2. A load sensing system on a vehicle as set forth in claim 1 wherein said chassis includes, a transmission housing, a final drive housing extending from said transmission housing, said drive wheel axles rotatably mounted on the sides of said final drive housing for driving said vehicle, said draft load sensing means mounted to said final drive housing by said drive axle housings and sensing strain on said housings and the deformation responsive to the draft load on said hitching means.

3. A load sensing system on a vehicle as set forth in claim 2 wherein said draft load sensing means includes a lever arrangement connected across said final drive housing for sensing a strain on said housing when a draft load is placed on said hitching means.

4. A load sensing system on a vehicle as set forth in claim 2 wherein said draft load sensing means includes strain gauges placed on said rear drive axle housings for sensing deformation of said housings responsive to draft loads on said hitching means.

5. A preload sensing system on a vehicle as set forth in claim 2 wherein said draft load sensing means includes a strain sensing mechanism mounted on said final drive housing for sensing deformation in said housings responsive to draft loads on said hitching means.

6. A preload sensing system on a vehicle as set forth in claim 2 comprising, means adapting said hitching means for connection to an implement, a hydraulic weight distribution system for distributing the weight on the wheels of said vehicle including, hydraulic rams for lifting and lowering the hitching means to distribute weight of the vehicle between the front wheels and the rear wheels of said vehicle.

7. A load sensing system on a vehicle as set forth in claim 2 wherein said draft load sensing means includes strain gauges mounted on said rear drive axle housings, an electrical circuit for amplifying signals generated by said strain gauges, a hydraulic weight distribution system including an electro-mechanical hydraulic control valve in a hydraulic system, said loading sensing system connected to said electro-mechanical hydraulic control valve for operating said valve responsive to draft loads on said hitching means for controlling the weight distribution on the wheels of said vehicle.

8. A load sensing system on a vehicle as set forth in claim 1 including a hydraulic weight distribution system for raising and lowering the hitching means adapted for coupling with an implement, a control valve in said hydraulic weight distribution system operated by said draft load sensing means to raise and lower the hitching means and the implement responsive to draft loads.

9. A load sensing system on a vehicle as set forth in claim 1 including hydraulic lift cylinders adapted for use with an implement for raising and lowering the implement responsive to draft load.

* * * * *